United States Patent
Nelson et al.

(10) Patent No.: US 11,748,502 B2
(45) Date of Patent: Sep. 5, 2023

(54) SYSTEM AND METHOD OF UTILIZING A SYSTEM TO SECURE A DOCUMENT

(71) Applicant: Dell Products L.P., Round Rock, TX (US)

(72) Inventors: Amy Christine Nelson, Round Rock, TX (US); Chooi Peng Low, Plano, TX (US)

(73) Assignee: Dell Products L.P., Round Rock, TX (US)

( * ) Notice: Subject to any disclaimer, the term of this patent is extended or adjusted under 35 U.S.C. 154(b) by 265 days.

(21) Appl. No.: 17/344,547

(22) Filed: Jun. 10, 2021

(65) Prior Publication Data

US 2022/0398332 A1 Dec. 15, 2022

(51) Int. Cl.
*G06F 21/62* (2013.01)
*H04L 9/06* (2006.01)
*G06F 21/60* (2013.01)

(52) U.S. Cl.
CPC ........ *G06F 21/6209* (2013.01); *G06F 21/602* (2013.01); *H04L 9/0643* (2013.01)

(58) Field of Classification Search
CPC . G06F 21/6209; G06F 21/602; H04L 9/0643; H04L 9/0825; H04L 9/0894
See application file for complete search history.

(56) References Cited

U.S. PATENT DOCUMENTS

| | | | |
|---|---|---|---|
| 7,178,021 B1 * | 2/2007 | Hanna | H04L 9/0825 713/150 |
| 10,778,658 B1 * | 9/2020 | Reddy | H04L 9/14 |
| 10,917,440 B1 * | 2/2021 | Reddy | H04L 63/0471 |
| 11,601,264 B2 * | 3/2023 | Christensen | H04L 9/3239 |
| 11,606,196 B1 * | 3/2023 | Valkaitis | H04L 9/085 |
| 2014/0189351 A1 * | 7/2014 | Steely | G06F 21/608 713/168 |
| 2015/0169894 A1 * | 6/2015 | Keohane | H04L 67/10 713/165 |
| 2021/0243030 A1 | 8/2021 | Robison et al. | |

OTHER PUBLICATIONS

Schneier, Bruce. "Applied Cryptography: Protocols, Algorithms, and Source Code in C." Second Edition, 1996.

\* cited by examiner

*Primary Examiner* — Mohammed Waliullah
(74) *Attorney, Agent, or Firm* — McDermott Will & Emery LLP (57) ABSTRACT

In one or more embodiments, a first information handling system (IHS) may: encrypt a document utilizing a symmetric encryption key to produce an encrypted document; and encrypt a metadata file, which includes the symmetric encryption key, utilizing a session encryption key to produce a first encrypted metadata file. In one or more embodiments, a second IHS may: decrypt the first encrypted metadata file utilizing the session encryption key to produce the metadata file; and encrypt the metadata file utilizing a public encryption key associated with a second TPM associated with a third IHS to produce a second encrypted metadata file. In one or more embodiments, the third information handling system may: decrypt the second encrypted metadata file utilizing a private encryption key associated with the second TPM to produce the metadata file; and decrypt the encrypted document utilizing the symmetric encryption key, from the metadata file, to produce the document.

20 Claims, 7 Drawing Sheets

SYSTEM AND METHOD OF UTILIZING A SYSTEM TO SECURE A DOCUMENT

BACKGROUND

Field of the Disclosure

This disclosure relates generally to information handling systems and more particularly to utilizing a system to secure a document.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, a system may include multiple information handling systems. In one example, a first information handling system of the multiple information handling systems may: encrypt a document utilizing a symmetric encryption key to produce an encrypted document; receive, by the first information handling system, an encrypted session encryption key from a second information handling system of the multiple information handling systems; decrypt the encrypted session encryption key utilizing a private encryption key associated with a first trusted platform module of the first information handling system to produce a session encryption key; encrypt a metadata file, which includes the symmetric encryption key, utilizing the session encryption key to produce a first encrypted metadata file; and provide the first encrypted metadata file to the second information handling system. In a second example, the second information handling system may: decrypt the first encrypted metadata file utilizing the session encryption key to produce the metadata file; encrypt the metadata file utilizing a public encryption key associated with a second trusted platform module associated with a third information handling system to produce a second encrypted metadata file; and provide, by the second information handling system, the second encrypted metadata file to the third information handling system. In another example, the third information handling system may: decrypt the second encrypted metadata file utilizing a private encryption key associated with the second trusted platform module to produce the metadata file; and decrypt the encrypted document utilizing the symmetric encryption key, from the metadata file, to produce the document.

In one or more embodiments, the third information handling system may include an agent. For example, the agent may be configured to: intercept a read request of the encrypted document; perform decrypting the encrypted document utilizing the symmetric encryption key, from the metadata file, to produce the document; and provide the document to an application executing on the third information handling system. For instance, the agent may include at least one of a filter driver and a kernel loadable module. In one or more embodiments, the third information handling system may be further configured to receive the encrypted document via one or more of the first information handling system, the second information handling system, an email, a web server, and a removable memory medium.

In one or more embodiments, the first information handling system may be further configured to generate the symmetric encryption key. In one or more embodiments, the first information handling system may be further configured to request the session encryption key from the second information handling system. In one or more embodiments, the second information handling system may be further configured to: receive a request for the session encryption key from the first information handling system; generate the session encryption key; and provide the session encryption key to the first information handling system. For example, generating the session encryption key and providing the session encryption key to the first information handling system may be performed in response to receiving the request for the session encryption key.

In one or more embodiments, the document may include a word processing document, a spreadsheet document, or a presentation document. In one or more embodiments, the second information handling system may store the public encryption key associated with the second trusted platform module without having to receive the public encryption key associated with the second trusted platform module from the third information handling system. In one or more embodiments, the third information handling system may include an application. For example, the application may be configured to read the document after the third information handling system decrypts the encrypted document utilizing the symmetric encryption key, from the metadata file, to produce the document.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, one or more corporate policies may instruct that confidential documents shall only be handled on corporate-approved, secured information handling systems. For example, implementing the one or more corporate policies may pose one or more challenges for corporate customers to ensure that those confidential documents are handled properly and/or securely with an adoption of corporate connected remote workplaces. In one instance, corporations may handle this via written and/or spoken policies, which may be ultimately unenforceable. In another instance, agent software and enforceable security policies, in tandem with a trusted platform module based key associated with the information handling systems, may ensure that a document does not leave an information handling system unencrypted. In one or more embodiments, this may also provide an ability to create a trusted connected information handling system ecosystem based at least on information handling systems that may be purchased by the corporation and may provide a security posture of the corporate customer.

In one or more embodiments, one or more systems may include a secure content registration information handling system, which may be tenant-aware, an endpoint agent, a trusted platform module based encryption key, and a third party verification service, among others. In one or more embodiments, when a purchase order from a corporate customer (e.g., an enterprise customer) is received, tenant provisioning may be initiated on a content registration information handling system. For example, identification information associated with information handling systems associated with the purchase order may be stored. For instance, identification information associated with information handling systems may include service tag information, serial numbers, and immutable trusted platform module public keys (e.g., generated in factory). In one or more embodiments, identification information associated with information handling systems may be provided to the content registration information handling system.

In one or more embodiments, endpoint information handling systems of a corporation (e.g., an enterprise) may be coupled to an ecosystem of the corporation (e.g., an ecosystem of the enterprise). For example, an administrator and/or one or more policies may define one or more content perimeters (e.g., one or more enterprise content perimeters, one or more corporate perimeters, etc.). For instance, the one or more content perimeters may be enforced by the content registration information handling system, which may act as an authorization information handling system for information sharing (e.g., document sharing).

In one or more embodiments, when a user sends a confidential document to another user within the corporation (e.g., the enterprise), an endpoint information handling system associated with the user may generate a document symmetric encryption key and may encrypt the confidential document with the document symmetric encryption key. For example, the encrypted document may be attached to an email or may be exported to a removable memory medium (e.g., a removable storage device such as a thumb drive). For instance, an endpoint agent may create a file that includes content metadata, the document symmetric encryption key, and an information handling system identifier.

In one or more embodiments, the endpoint agent may retrieve a one-time session encryption key from the content registration information handling system. For example, the content registration information handling system may generate the one-time session encryption key, may encrypt the one-time session encryption key with a public encryption key of a trusted platform module of a requesting information handling system, and may return an encrypted one-time session encryption key to an endpoint agent of the requesting information handling system. For instance, the endpoint agent of the requesting information handling system may decrypt the encrypted one-time session encryption key with a private encryption key of the trusted platform module of the requesting information handling system, may encrypt the metadata file with the one-time session encryption key, and may send an encrypted metadata file to the content information handling system, which may decrypt the encrypted metadata file and may store the metadata file.

In one or more embodiments, when an attempt is made to open the document by a recipient, an endpoint agent on a recipient information handling system may contact the content registration information handling system with a machine identifier associated with the recipient information handling system and the metadata file that was received. For example, the content registration information handling system may retrieve the document symmetric encryption key from storage and may encrypt the document symmetric encryption key with a public encryption key of a trusted platform module of the recipient information handling system to produce an encrypted document symmetric encryption key. For instance, the encrypted document symmetric encryption key may be received by the recipient information handling system, which may utilize a private encryption key of the trusted platform module of the recipient information handling system to decrypt the encrypted document symmetric encryption key to obtain the document symmetric encryption key. In one or more embodiments, the recipient information handling system may utilize document symmetric encryption key to decrypt the encrypted document to obtain the document. For example, after the recipient information handling system decrypts the encrypted document to obtain the document, an application of the recipient information handling system may open and/or read the document.

Figure 1:
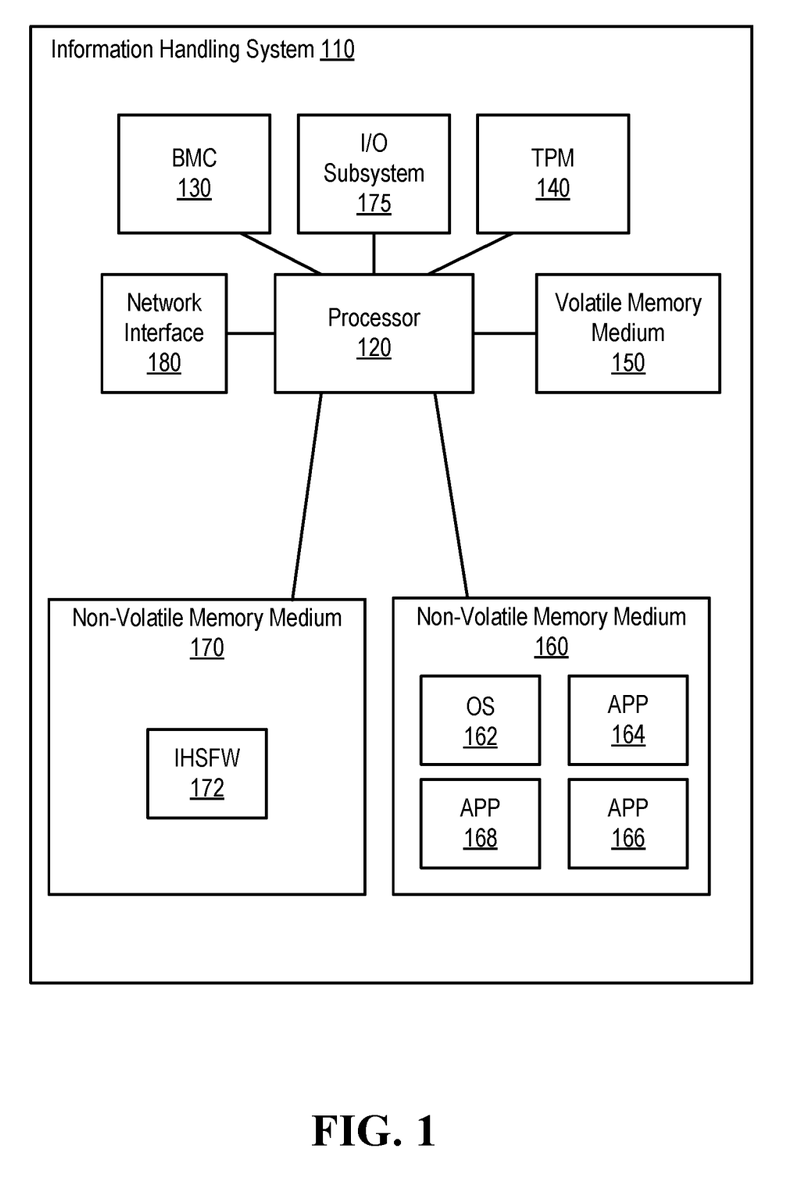
FIG. 1 illustrates an example of an information handling system, according to one or more embodiments.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a baseboard management controller (BMC) 130, a trusted platform module (TPM) 140, a volatile memory medium 150, non-volatile memory media 160 and 170, an I/O subsystem 175, and a network interface 180. As illustrated, BMC 130, TPM 140, volatile memory medium 150, non-volatile memory media 160 and 170, I/O subsystem 175, and network interface 180 may be communicatively coupled to processor 120.

In one or more embodiments, one or more of BMC 130, TPM 140, volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of BMC 130, TPM 140, volatile memory medium 150, non-volatile memory media 160 and 170, I/O subsystem 175, and network interface 180 may be communicatively coupled to processor 120 via one or more PCI-Express (PCIe) root complexes. In another example, one or more of BMC 130, TPM 140, I/O subsystem 175, and network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing at least a portion of one or more systems, at least a portion of one or more flowcharts, at least a portion of one or more methods, and/or at least a portion of one or more processes described herein. In one example, processor 120 may execute processor instructions from one or more of memory media 150, 160, and 170 in implementing at least a portion of one or more systems, at least a portion of one or more flowcharts, at least a portion of one or more methods, and/or at least a portion of one or more processes described herein. In another example, processor 120 may execute processor instructions via network interface 180 in implementing at least a portion of one or more systems, at least a portion of one or more flowcharts, at least a portion of one or more methods, and/or at least a portion of one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162, and APPs 164-168 may include processor instructions executable by processor 120. In one example, processor 120 may execute processor instructions of one or more of OS 162, and APPs 164-168 via non-volatile memory medium 160. In another example, one or more portions of the processor instructions of the one or more of OS 162, and APPs 164-168 may be transferred to volatile memory medium 150, and processor 120 may execute the one or more portions of the processor instructions of the one or more of OS 162, and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

In one or more embodiments, BMC 130 may be or include a remote access controller. For example, the remote access controller may be or include a DELL™ Remote Access Controller (DRAC). In one or more embodiments, a remote access controller may be integrated into IHS 110. For example, the remote access controller may be or include an integrated DELL™ Remote Access Controller (iDRAC). In one or more embodiments, a remote access controller may include one or more of a processor, a memory, and a network interface, among others. In one or more embodiments, a remote access controller may access one or more busses and/or one or more portions of IHS 110. For example, the remote access controller may include and/or may provide power management, virtual media access, and/or remote console capabilities, among others, which may be available via a web browser and/or a command line interface. For instance, the remote access controller may provide and/or permit an administrator (e.g., a user) one or more abilities to configure and/or maintain an information handling system as if the administrator was at a console of the information handling system and/or had physical access to the information handling system.

In one or more embodiments, a remote access controller may interface with baseboard management controller integrated circuits. In one example, the remote access controller may be based at least on an Intelligent Platform Management Interface (IPMI) standard. For instance, the remote access controller may allow and/or permit utilization of IPMI out-of-band interfaces such as IPMI Over LAN (local area network). In another example, the remote access controller may be based at least on a Redfish standard. In one instance, one or more portions of the remote access controller may be compliant with one or more portions of a Redfish standard. In another instance, one or more portions of the remote access controller may implement one or more portions of a Redfish standard. In one or more embodiments, a remote access controller may include and/or provide one or more internal private networks. For example, the remote access controller may include and/or provide one or more of an Ethernet interface, a front panel USB interface, and a Wi-Fi interface, among others. In one or more embodiments, a remote access controller may be, include, or form at least a portion of a virtual KVM (keyboard, video, and mouse) device. For example, a remote access controller may be, include, or form at least a portion of a KVM over IP (IPKVM) device. For instance, a remote access controller may capture video, keyboard, and/or mouse signals; may convert the signals into packets; and may provide the packets to a remote console application via a network.

In one or more embodiments, BMC 130 may be or include a microcontroller. For example, a microcontroller may be or include an 8051 microcontroller, an ARM Cortex-M (e.g., Cortex-M0, Cortex-M1, Cortex-M3, Cortex-M4, Cortex-M7, etc.) microcontroller, a MSP430 microcontroller, an AVR (e.g., 8-bit AVR, AVR-32, etc.) microcontroller, a PIC microcontroller, a 68HC11 microcontroller, a ColdFire microcontroller, and a Renesas microcontroller, among others. In one or more embodiments, BMC 130 may be or include an application processor. In one example, an application processor may be or include an ARM Cortex-A processor. In another example, an application processor may be or include an Intel Atom processor. In one or more embodiments, BMC 130 may be or include one or more of a field programmable gate array (FPGA) and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

In one or more embodiments, TPM 140 may include one or more of a microcontroller, a hardware random number generator, a hash value generator, a non-volatile memory medium, and a volatile memory medium, among others. In one example, the non-volatile memory medium of TPM 140 may store one or more of an endorsement key and a storage root key, among others. In a second example, the volatile memory medium of TPM 140 may be utilized to store one or more of an attestation identity key and storage keys, among others. In a third example, the volatile memory medium of TPM 140 may be utilized to implement one or more registers. For instance, the volatile memory medium of TPM 140 may be utilized to implement one or more platform configuration registers (PCRs). In another example, the microcontroller may be configured to secure hardware through integrated cryptographic keys. In one or more embodiments, TPM 140 may be compliant with International Organization for Standardization (ISO)/International Electrotechnical Commission (IEC) 11889. In one or more embodiments, TPM 140 may be compliant with one or more TPM specifications available from the Trusted Computing Group (TCG). In one or more embodiments, TPM 140 may be or include one or more of a FPGA and an ASIC, among others, configured, coded, and/or encoded with instructions in accordance with at least a portion of one or more of systems, at least a portion of one or more flowcharts, at least a portion of one or more methods, and/or at least a portion of one or more processes described herein.

In one or more embodiments, TPM 140 may be utilized to assure the integrity of IHS 110. In that context, for example, "integrity" may mean "behave as intended". In one or more embodiments, TPM 140 may be utilized to ensure that a boot process begins from a trusted combination of hardware and software and may continue until OS 162 has fully booted. In one or more embodiments, IHSFW 172 may utilize TPM 140 form a root of trust. For example, one or more of the PCRs may be utilized for secure storage and/or reporting of one or more security metrics. For example, the one or more security metrics may be utilized to detect one or more changes from a previous configuration and/or may determine how to proceed if the one or more changes from the previous configuration are detected.

Figure 2:
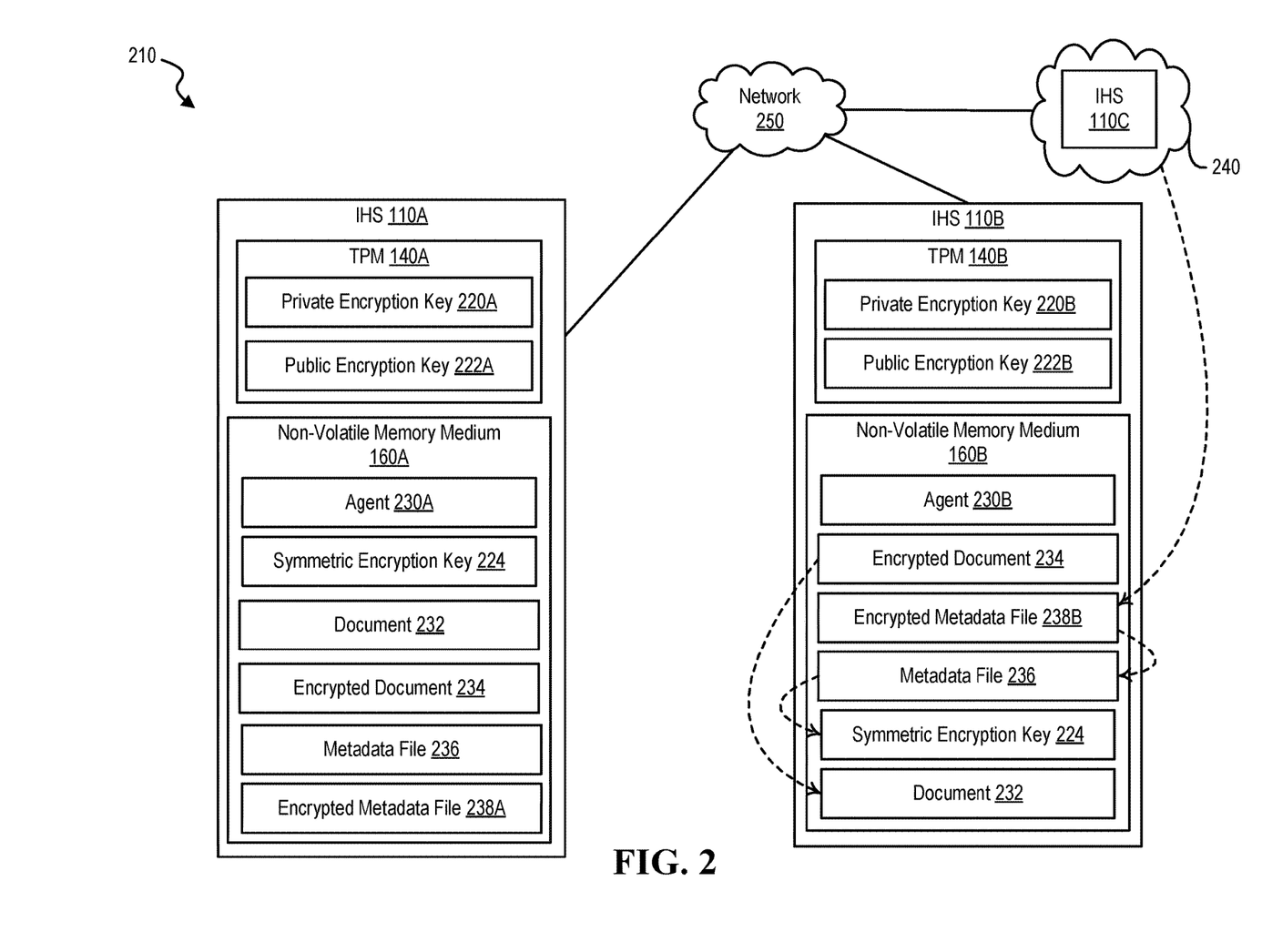
FIG. 2 illustrates an example of a system, according to one or more embodiments.

Turning now to FIG. 2, an example of a system is illustrated, according to one or more embodiments. In one or more embodiments, a system 210 may include one or more of an IHS 110A, an IHS 110B, an IHS 110C, and a cloud system 240, among others. For example, information handling systems (IHSs) 110A-110C may be coupled to a network 250. In one or more embodiments, network 250 may include a wired network, a wireless network, an optical network, or a combination of the foregoing, among others. For example, network 250 may include and/or be coupled to various types of communications networks. For instance, network 250 may include and/or be coupled to a LAN, a WAN (e.g., a private WAN, a corporate WAN, a public WAN, etc.), an Internet, a public switched telephone network (PSTN), a cellular telephone network, a satellite telephone network, or a combination of the foregoing, among others. In one or more embodiments, system 210 may include network 250.

In one or more embodiments, IHS 110A may include a TPM 110A. For example, TPM 110A may include private encryption key 220A and public encryption key 222A. In one or more embodiments, private encryption key 220A may be different from public encryption key 222A. For example, private encryption key 220A and public encryption key 222A may be asymmetric encryption keys. In one instance, data encrypted via private encryption key 220A may be decrypted via public encryption key 222A. In another instance, data encrypted via public encryption key 222A may be decrypted via private encryption key 220A.

In one or more embodiments, non-volatile memory medium 160A of IHS 110A may include an agent 230A. In one or more embodiments, agent 230A may include processor instructions executable by a processor 120 of IHS 110A. In one example, processor 120 of IHS 110A may execute processor instructions of agent 230A via non-volatile memory medium 160 of IHS 110A. In another example, one or more portions of the processor instructions of agent 230A may be transferred to a volatile memory medium 150 of IHS 110A, and processor 120 of IHS 110A may execute the one or more portions of the processor instructions of agent 230A via volatile memory medium 50 of IHS 110A.

In one or more embodiments, processor 120 of IHS 110A may execute processor instructions in implementing at least a portion of one or more systems, at least a portion of one or more flowcharts, at least a portion of one or more methods, and/or at least a portion of one or more processes described herein. In one example, processor 120 of IHS 110A may execute processor instructions from one or more of memory media 150, 160, and 170 of IHS 110A in implementing at least a portion of one or more systems, at least a portion of one or more flowcharts, at least a portion of one or more methods, and/or at least a portion of one or more processes described herein. In another example, processor 120 of IHS 110A may execute processor instructions via network interface 180 of IHS 110A in implementing at least a portion of one or more systems, at least a portion of one or more flowcharts, at least a portion of one or more methods, and/or at least a portion of one or more processes described herein.

In one or more embodiments, agent 230A may generate a symmetric encryption key 224 to encrypt a document 232. For example, non-volatile memory medium 160A may store one or more of symmetric encryption key 224 and document 232, among others. In one or more embodiments, agent 230A may utilize symmetric encryption key 224 to encrypt document 232 to produce encrypted document 234. For example, non-volatile memory medium 160A may store encrypted document 234.

In one or more embodiments, agent 230A may generate a metadata file 236. For example, metadata file 236 may include one or more of symmetric encryption key 224, an encryption mode process identification, and an encryption mode associated with an encryption process associated with the encryption mode process identification, among others. For instance, non-volatile memory medium 160A may store metadata file 236.

In one or more embodiments, IHS 110B may include a TPM 110B. For example, TPM 110B may include private encryption key 220B and public encryption key 222B. In one or more embodiments, private encryption key 220B may be different from public encryption key 222B. For example, private encryption key 220B and public encryption key 222B may be asymmetric encryption keys. In one instance, data encrypted via private encryption key 220B may be decrypted via public encryption key 222B. In another instance, data encrypted via public encryption key 222B may be decrypted via private encryption key 220B.

In one or more embodiments, non-volatile memory medium 160B of IHS 110B may include an agent 230B. In one or more embodiments, agent 230B may include processor instructions executable by a processor 120 of IHS 110B. In one example, processor 120 of IHS 110B may execute processor instructions of agent 230B via non-volatile memory medium 160 of IHS 110B. In another example, one or more portions of the processor instructions of agent 230B may be transferred to a volatile memory medium 150 of IHS 110B, and processor 120 of IHS 110B may execute the one or more portions of the processor instructions of agent 230B via volatile memory medium 50 of IHS 110B.

In one or more embodiments, processor 120 of IHS 110B may execute processor instructions in implementing at least a portion of one or more systems, at least a portion of one or more flowcharts, at least a portion of one or more methods, and/or at least a portion of one or more processes described herein. In one example, processor 120 of IHS 110B may execute processor instructions from one or more of memory media 150, 160, and 170 of IHS 110B in implementing at least a portion of one or more systems, at least a portion of one or more flowcharts, at least a portion of one or more methods, and/or at least a portion of one or more processes described herein. In another example, processor 120 of IHS 110B may execute processor instructions via network interface 180 of IHS 110B in implementing at least a portion of one or more systems, at least a portion of one or more flowcharts, at least a portion of one or more methods, and/or at least a portion of one or more processes described herein.

In one or more embodiments, IHS 110B may receive encrypted document 234. For example, IHS 110B may receive encrypted document 234 from one or more of cloud system 240, IHS 110A, IHS 110C, network 250, an email, a web server, and a removable memory medium (e.g., a thumb drive, a USB drive, etc.), among others. In one or more embodiments, agent 230B may decrypt encrypted metadata file 238 utilizing private encryption key 220B to produce metadata file 236. For example, agent 230B may obtain symmetric encryption key 224 from metadata file 236. For instance, agent 230B may decrypt encrypted document 234 utilizing symmetric encryption key 224 to produce document 232. In one or more embodiments, an application executing on IHS 110B may open and/or read document 232. Although system 210 is illustrated as including IHSs 110A-110C, system 210 may include any number of IHSs 110, according to one or more embodiments. Moreover, although cloud system 240 is illustrated as including IHS 110C, cloud system 240 may include any number of IHSs 110, according to one or more embodiments Turning now to FIG. 3A, an example of a method of operating a system is illustrated, according to one or more embodiments. At 310, a symmetric encryption key may be generated. For example, agent 230A may generate symmetric encryption key 224. At 315, a document may be encrypted to produce an encrypted document. For example, agent 230A may encrypt document 232. For instance, agent 230A may encrypt a document 232 using symmetric encryption key 224 to produce encrypted document 234.

Figure 3A:
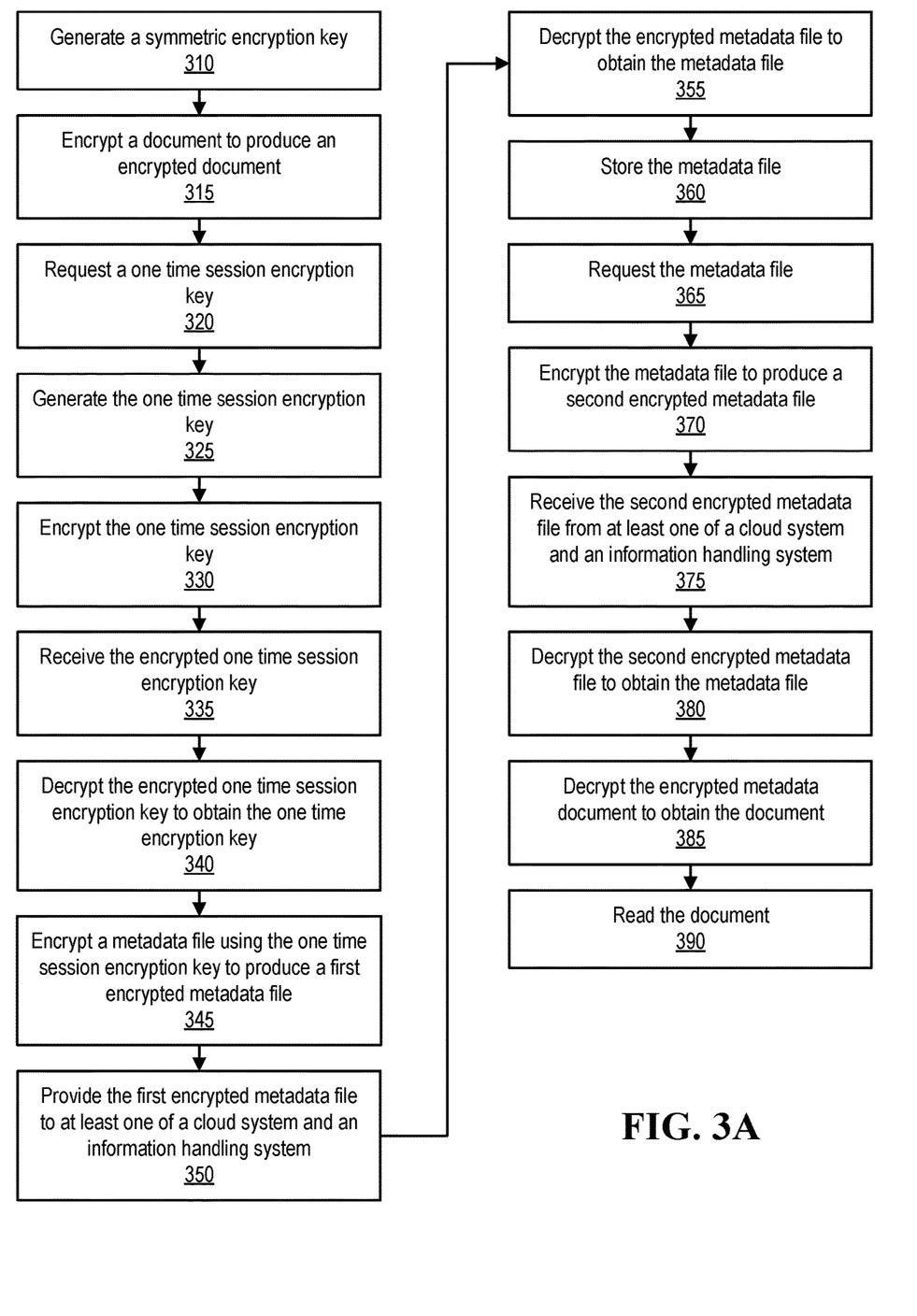
FIG. 3A illustrates an example of a method of operating a system, according to one or more embodiments.

In one or more embodiments, a document may include one or more directories and/or one or more files. For example, document 232 may include one or more directories and/or one or more files. In one or more embodiments, the document includes a word processing document, a spreadsheet document, or a presentation document. In one example, a word processing document may include a MICROSOFT® Word word processing document. In a second example, a word processing document may include an APPLE® Pages word processing document. In a third example, a spreadsheet document may include a MICROSOFT® Excel spreadsheet document. In a fourth example, a spreadsheet document may include an APPLE® Numbers spreadsheet document. In a fifth example, a presentation document may include a MICROSOFT® PowerPoint presentation document. In another example, a presentation document may include an APPLE® Keynote presentation document.

At 320, a one time session encryption key may be requested. In one example, agent 230A may request a one time session encryption key from cloud system 240. For instance, agent 230A may request the one time session encryption key from cloud system 240 via network 250. In another example, agent 230A may request a one time session encryption key from IHS 110C. For instance, agent 230A may request the one time session encryption key from IHS 110C via network 250. In one or more embodiments, the one time session encryption key may be a symmetric encryption key. For example, the one time session encryption key may be a symmetric encryption key that may only be utilized for a single session. In one instance, the single session may include a single communications session. In another instance, the single session may include a single transaction.

At 325, the one time session encryption key may be generated. In one example, cloud system 240 may generate the one time session encryption key. In another example, IHS 110C may generate the one time session encryption key. In one or more embodiments, generating the one time session encryption key may include retrieving the one time session encryption key from storage. For example, generating the one time session encryption key may include retrieving the one time session encryption key from a memory medium.

At 330, the one time session encryption key may be encrypted. In one example, cloud system 240 may encrypt the one time session encryption key to produce an encrypted one time session encryption key. For instance, cloud system

240 may encrypt the one time session encryption key utilizing public encryption key 222A to produce the encrypted one time session encryption key. In another example, IHS 110C may encrypt the one time session encryption key to produce an encrypted one time session encryption key. For instance, IHS 110C may encrypt the one time session encryption key utilizing public encryption key 222A to produce the encrypted one time session encryption key.

At 335, the encrypted one time session encryption key may be received. In one example, agent 230A may receive the encrypted one time session encryption key from cloud system 240. For instance, agent 230A may receive the encrypted one time session encryption key from cloud system 240 via network 250. In another example, agent 230A may receive the encrypted one time session encryption key from IHS 110C. For instance, agent 230A may receive the encrypted one time session encryption key from IHS 110C via network 250.

At 340, the encrypted one time session encryption key may be decrypted to obtain the one time session encryption key. For example, agent 230A may decrypt the encrypted one time session encryption key to obtain the one time session encryption key. For instance, agent 230A may decrypt the encrypted one time session encryption key utilizing private encryption key 220A to obtain the one time session encryption key.

At 345, a metadata file may be encrypted using the one time session encryption key to produce a first encrypted metadata file. For example, agent 230A may encrypt metadata file 236 utilizing the one time session encryption key to produce encrypted metadata file 238A. In one or more embodiments, metadata file 236 may include symmetric encryption key 224, which may be utilized to decrypt encrypted file 234 to obtain file 232.

At 350, the first encrypted metadata file may be provided to at least one of a cloud system and an information handling system. For example, agent 230A may provide encrypted metadata file 238A to at least one of cloud system 240 and IHS 110C. For instance, agent 230A may provide encrypted metadata file 238A to the at least one of cloud system 240 and IHS 110C via network 250.

At 355, the first encrypted metadata file may be decrypted to obtain the metadata file. In one example, cloud system 240 may decrypt encrypted metadata file 238A using the session encryption key to obtain metadata file 236. In another example, IHS 110C may decrypt encrypted metadata file 238A utilizing the session encryption key to obtain metadata file 238A.

At 360, the metadata file may be stored. In one example, cloud system 240 may store metadata file 236. In another example, IHS 110C may store metadata file 236. In one or more embodiments, storing the metadata file may include storing the metadata file via at least one of a memory medium, a file system, and a database, among others.

At 365, the metadata file may be requested. In one example, agent 230B may request metadata file 236 from cloud system 240. For instance, agent 230B may request metadata file 236 from cloud system 240 via network 250. In another example, agent 230B may request metadata file 236 from IHS 110C. For instance, agent 230B may request metadata file 236 from IHS 110C via network 250.

In one or more embodiments, cloud system 240 may receive a request for metadata file 236. For example, cloud system 240 may receive a request for metadata file 236 from agent 230B. For instance, cloud system 240 may receive a request for metadata file 236 from agent 230B via network 250. In one or more embodiments, IHS 110C may receive a request for metadata file 236. For example, IHS 110C may receive a request for metadata file 236 from agent 230B. For instance, IHS 110C may receive a request for metadata file 236 from agent 230B via network 250.

At 370, the metadata file may be encrypted. In one example, cloud system 240 may encrypt the metadata file to produce a second encrypted metadata file. For instance, cloud system 240 may encrypt metadata file 236 utilizing public encryption key 222B to produce encrypted metadata file 238B. In another example, IHS 110C may encrypt the metadata file to produce a second encrypted metadata file. For instance, IHS 110C may encrypt metadata file 236 using public encryption key 222B to produce encrypted metadata file 238B.

At 375, the second encrypted metadata file may be received. For example, agent 230B may receive encrypted metadata file 238B. In one or more embodiments, at least one of cloud system 240 and IHS 110C may provide encrypted metadata file 238B to agent 230B. For example, the at least one of cloud system 240 and IHS 110C may provide encrypted metadata file 238B to agent 230B via network 250.

At 380, the second encrypted metadata file may be decrypted to obtain the metadata file. For example, agent 230B may decrypt encrypted metadata file 238B to obtain metadata file 236. For instance, agent 230B may decrypt encrypted metadata file 238B using private key 220B to obtain metadata file 236.

At 385, the encrypted document may be decrypted to obtain the document. For example, agent 230B may decrypt encrypted document 234 to obtain document 232. For instance, agent 230B may decrypt encrypted document 234 using symmetric encryption key 224 to obtain document 232. In one or more embodiments, agent 230B may have obtained symmetric encryption key 224 from metadata file 236. In one or more embodiments, agent 230B may have obtained encrypted document 234 from one or more of cloud system 240, IHS 110A, IHS 110C, a network, an email, a web server, and a removable memory medium (e.g., a thumb drive, a USB drive, etc.), among others. At 390, the document may be read. For example, document 232 may be read by an application executing on IHS 110B.

Figure 3B:
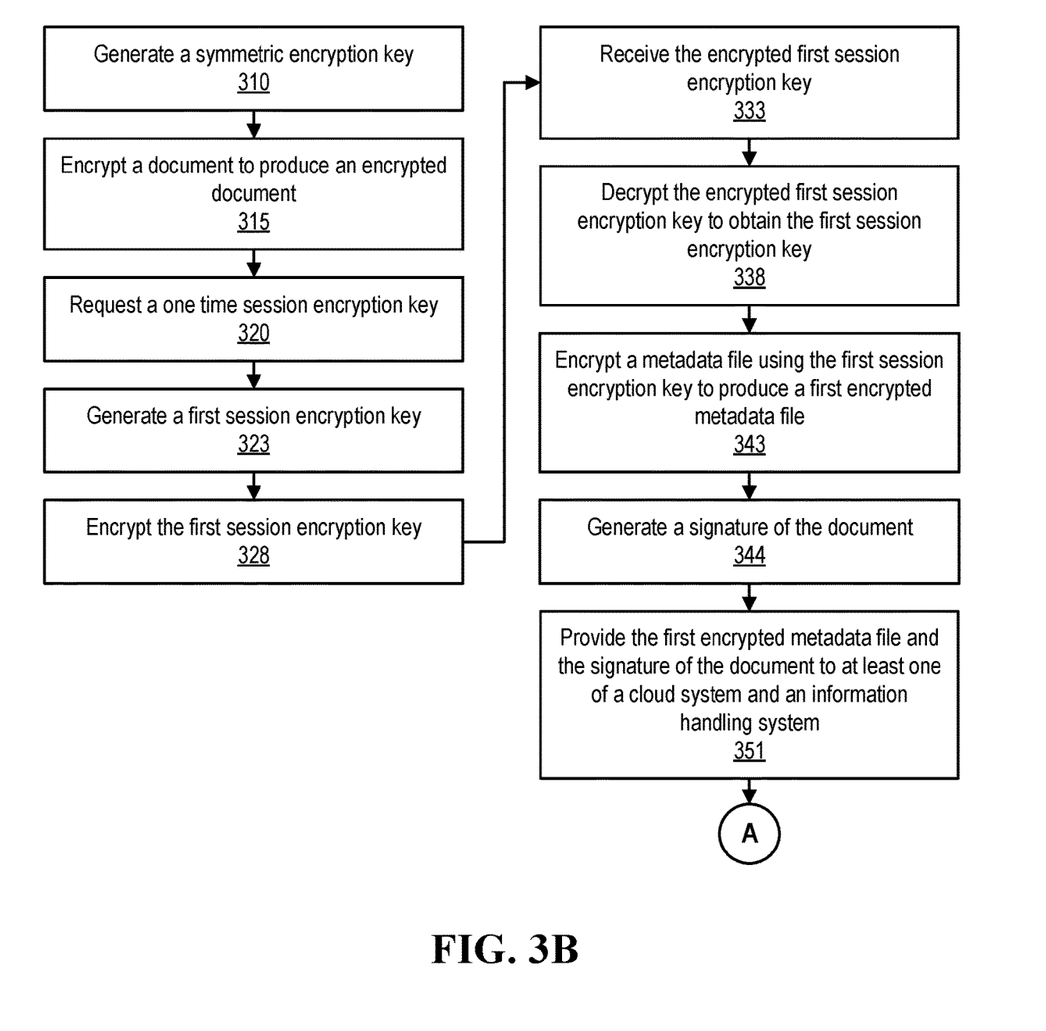
FIGS. 3B and 3C illustrate a second example of a method of operating a system, according to one or more embodiments.
Figure 3C:
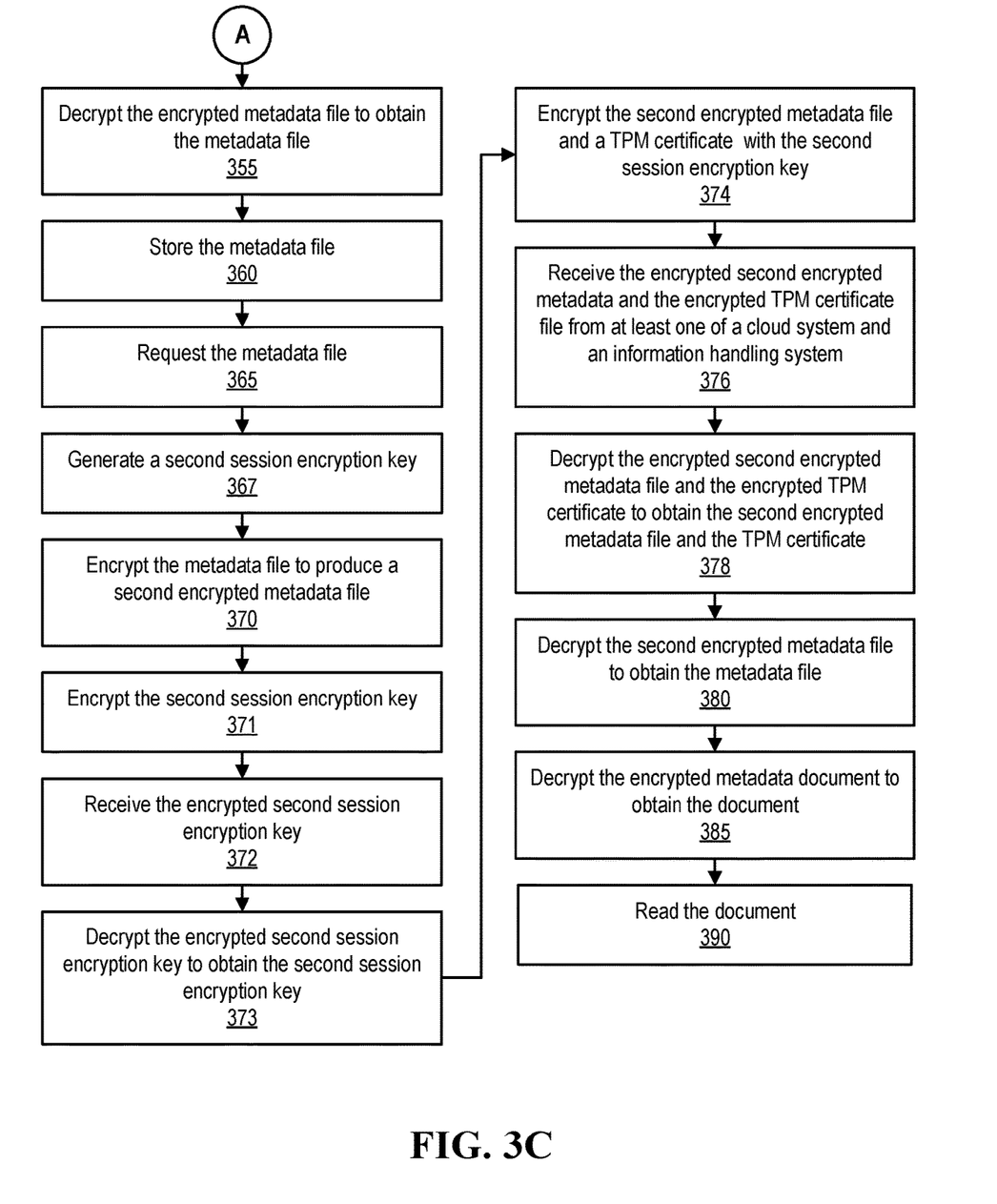

Turning now to FIGS. 3B and 3C, a second example of a method of operating a system is illustrated, according to one or more embodiments. At 310, a symmetric encryption key may be generated. For example, agent 230A may generate symmetric encryption key 224. At 315, a document may be encrypted to produce an encrypted document. For example, agent 230A may encrypt document 232. For instance, agent 230A may encrypt a document 232 using symmetric encryption key 224 to produce encrypted document 234. In one or more embodiments, a document may include one or more directories and/or one or more files. For example, document 232 may include one or more directories and/or one or more files.

At 320, a one time session encryption key may be requested. In one example, agent 230A may request a one time session encryption key from cloud system 240. For instance, agent 230A may request a one time session encryption key from cloud system 240 via network 250. In another example, agent 230A may request a one time session encryption key from cloud system IHS 110C. For instance, agent 230A may request a one time session encryption key from IHS 110C via network 250. In one or more embodiments, the one time session encryption key may be a symmetric encryption key. For example, the one time session encryption key may be a symmetric encryption key that may only be utilized for a single session. In one instance, the single session may include a single communications session. In another instance, the single session may include a single transaction.

At 323, a first session encryption key may be generated. In one example, cloud system 240 may generate the first session encryption key. In another example, IHS 110C may generate the first session encryption key. In one or more embodiments, generating the first session encryption key may include retrieving the first session encryption key from storage. For example, generating the first session encryption key may include retrieving the first session encryption key from a memory medium.

At 328, the first session encryption key may be encrypted. In one example, cloud system 240 may encrypt the first session encryption key to produce an encrypted first session encryption key. For instance, cloud system 240 may encrypt the first session encryption key utilizing public encryption key 222A to produce the encrypted first session encryption key. In another example, IHS 110C may encrypt the first session encryption key to produce an encrypted first session encryption key. For instance, IHS 110C may encrypt the first session encryption key utilizing public encryption key 222A to produce the encrypted first session encryption key.

At 333, the encrypted first session encryption key may be received. In one example, agent 230A may receive the encrypted first session encryption key from cloud system 240. For instance, agent 230A may receive the encrypted first session encryption key from cloud system 240 via network 250. In another example, agent 230A may receive the encrypted first session encryption key from IHS 110C. For instance, agent 230A may receive the encrypted first session encryption key from IHS 110C via network 250.

At 338, the encrypted first session encryption key may be decrypted to obtain the first session encryption key. For example, agent 230A may decrypt the encrypted first session encryption key to obtain the first session encryption key. For instance, agent 230A may decrypt the encrypted first session encryption key utilizing private encryption key 220A to obtain the first session encryption key.

At 343, a metadata file may be encrypted utilizing the first session encryption key to produce a first encrypted metadata file. For example, agent 230A may encrypt metadata file 236 utilizing the first session encryption key to produce encrypted metadata file 238A. In one or more embodiments, the metadata file may include symmetric encryption key 224, which may be utilized to decrypt encrypted file 234 to obtain file 232.

At 344, a signature of the document may be generated. For example, agent 230A may generate a signature of document 232. For instance, agent 230A may determine a hash value of document 232 and may encrypt the hash value of document 232 utilizing private encryption key 220A to produce the signature of document 232.

In one or more embodiments, a hash value of data may be determined via a one-way hash function. In one example, a one-way hash function may be relatively easy to compute. For instance, for data x (e.g., a number, a string, binary data, etc.) and a one-way hash function h, h(x) may be relatively easy to compute. In another example, a one-way hash function may significantly difficult to reverse. For instance, for the one-way hash function h and a hash value h(z), z may be significantly difficult to compute. In one or more embodiments, significantly difficult to compute may mean that it may take years to compute z from h(z), even if multiple computers were applied to such a task.

In one or more embodiments, a one-way hash function may be considered collision free. For example, the one-way hash function may be injective or one-to-one. For instance, $h(z_1)$ and $h(z_2)$ may produce different values, where $z_1$ and $z_2$ are different. In one or more embodiments, a one-way hash function may be considered a cryptographic checksum, a message digest, a digital fingerprint, a message integrity check, a contraction function, a compression function, and/or a manipulation detection code, among others. Examples of one-way hash functions may include one or more of an Abreast Davies-Meyer, a Davies-Meyer, a message digest (MD) 2, a MD 4, a MD 5, a RIPE-MD, a GOST Hash, a N-HASH, a HAVAL, a SHA (secure hash algorithm) (e.g., SHA-1, SHA-2, SHA-3, SHA-256, SHA-384, SHA-512, etc.), and a SNEFRU, among others. In one or more embodiments, a one-way hash function may be a composite function of two or more one-way hash functions. For example, a function $h_1$ may include a MD 5 one-way hash function $h_2$, a SHA one-way hash function $h_3$, and a MD 5 one-way hash function $h_4$, such that $h_1=h_2(h_3(h_4(z)))$. For instance, a one-way hash function that is a composite function of two or more one-way hash functions may be considered to be and/or may be said to be strengthened.

At 351, the first encrypted metadata file and the signature of the document may be provided to at least one of a cloud system and an information handling system. For example, agent 230A may provide encrypted metadata file 238A and the signature of document 232 to at least one of cloud system 240 and IHS 110C. For instance, agent 230A may provide encrypted metadata file 238A and the signature of document 232 to the at least one of cloud system 240 and IHS 110C via network 250.

At 355, the first encrypted metadata file may be decrypted to obtain the metadata file. In one example, cloud system 240 may decrypt encrypted metadata file 238A utilizing the first session encryption key to obtain metadata file 236. In another example, IHS 110C may decrypt encrypted metadata file 238A utilizing the first session encryption key to obtain metadata file 238A.

At 360, the metadata file may be stored. In one example, cloud system 240 may store metadata file metadata file 236. In another example, IHS 110C may store metadata file 236. In one or more embodiments, storing the metadata file may include storing the metadata file via at least one of a memory medium, a file system, and a database, among others.

At 365, the metadata file may be requested. In one example, agent 230B may request the metadata file from cloud system 240. For instance, agent 230B may request the metadata file from cloud system 240 via network 250. In another example, agent 230B may request the metadata file from IHS 110C. For instance, agent 230B may request the metadata file from IHS 110C via network 250.

In one or more embodiments, cloud system 240 may receive a request for the metadata file. For example, cloud system 240 may receive a request for the metadata file from agent 230B. For instance, cloud system 240 may receive a request for the metadata file from agent 230B via network 250. In one or more embodiments, IHS 110C may receive a request for the metadata file. For example, IHS 110C may receive a request for the metadata file from agent 230B. For instance, IHS 110C may receive a request for the metadata file from agent 230B via network 250.

At 367, a second session encryption key may be generated. In one example, cloud system 240 may generate the second session encryption key. In another example, IHS 110C may generate the second session encryption key. In one or more embodiments, generating the second session encryption key may include retrieving the second session encryption key from storage. For example, generating the second session encryption key may include retrieving the second session encryption key from a memory medium.

At 370, the metadata file may be encrypted. In one example, cloud system 240 may encrypt the metadata file to produce a second encrypted metadata file. For instance, cloud system 240 may encrypt metadata file 236 utilizing public encryption key 222B to produce encrypted metadata file 238B. In another example, IHS 110C may encrypt the metadata file to produce a second encrypted metadata file. For instance, IHS 110C may encrypt metadata file 236 using public encryption key 222B to produce encrypted metadata file 238B.

At 371, the second session encryption key may be encrypted. In one example, cloud system 240 may encrypt the second session encryption key to produce an encrypted second session encryption key. For instance, cloud system 240 may encrypt the second session encryption key utilizing public encryption key 222B to produce the encrypted second session encryption key. In another example, IHS 110C may encrypt the second session encryption key to produce an encrypted second session encryption key. For instance, IHS 110C may encrypt the second session encryption key utilizing public encryption key 222B to produce the encrypted second session encryption key.

At 372, the encrypted second session encryption key may be received. In one example, agent 230B may receive the encrypted second session encryption key from cloud system 240. For instance, agent 230B may receive the encrypted second session encryption key from cloud system 240 via network 250. In another example, agent 230B may receive the encrypted second session encryption key from IHS 110C. For instance, agent 230B may receive the encrypted second session encryption key from IHS 110C via network 250.

At 373, the encrypted second session encryption key may be decrypted to obtain the second session encryption key. For example, agent 230B may decrypt the encrypted second session encryption key to obtain the second session encryption key. For instance, agent 230B may decrypt the encrypted second session encryption key utilizing private encryption key 220B to obtain the second session encryption key.

At 374, the second encrypted metadata file and a TPM certificate may be encrypted with the second session encryption key. In one example, cloud system 240 may encrypt the metadata file and a TPM certificate to produce an encrypted second encrypted metadata file and an encrypted TPM certificate. For instance, cloud system 240 may encrypt the second encrypted metadata file and the TPM certificate utilizing the second session encryption key to produce an encrypted second encrypted metadata file and an encrypted TPM certificate. In another example, IHS 110C may encrypt the second encrypted metadata file and a TPM certificate to produce an encrypted second encrypted metadata file. For instance, IHS 110C may encrypt the second encrypted metadata file and the TPM certificate using the second session encryption key to produce an encrypted second encrypted metadata file and an encrypted TPM certificate.

At 376, the encrypted second encrypted metadata file and an encrypted TPM certificate may be received. For example, agent 230B may receive the encrypted second encrypted metadata file and an encrypted TPM certificate associated with TPM 140A. In one or more embodiments, at least one of cloud system 240 and IHS 110C may provide the encrypted second encrypted metadata file and the encrypted TPM certificate to agent 230B. For example, the at least one of cloud system 240 and IHS 110C may provide the encrypted second encrypted metadata file and the encrypted TPM certificate to agent 230B via network 250.

At 378, the encrypted second encrypted metadata file and the encrypted TPM certificate may be decrypted to obtain the second encrypted metadata file and a TPM certificate. For example, agent 230B may decrypt the encrypted second encrypted metadata file and the encrypted TPM certificate to obtain encrypted metadata file 238B and a TPM certificate associated with TPM 140A. For instance, agent 230B may decrypt the encrypted second encrypted metadata file and the encrypted TPM certificate utilizing the second session encryption key to obtain encrypted metadata file 238B and the TPM certificate associated with TPM 140A.

At 380, the second encrypted metadata file may be decrypted to obtain the metadata file. For example, agent 230B may decrypt encrypted metadata file 238B to obtain metadata file 236. For instance, agent 230B may decrypt encrypted metadata file 238B using private key 220B to obtain metadata file 236.

At 385, the encrypted document may be decrypted to obtain the document. For example, agent 230B may decrypt encrypted document 234 to obtain document 232. For instance, agent 230B may decrypt encrypted document 234 using symmetric encryption key 224 to obtain document 232. In one or more embodiments, agent 230B may have obtained symmetric encryption key 224 from metadata file 236.

In one or more embodiments, agent 230B may have obtained encrypted document 234 from one or more of cloud system 240, IHS 110A, IHS 110C, a network, an email, a web server, and a removable memory medium (e.g., a thumb drive, a USB drive, etc.), among others. In one or more embodiments, the TPM certificate associated with TPM 140A may include public encryption key 222A. For example, the signature of document 232 may be decrypted to determine the hash value of document 232. For instance, agent 230B may decrypt the signature of document 232 utilizing public encryption key 222A to obtain the hash value of document 232.

In one or more embodiments, a test hash value of document 232 may be determined. For example, agent 230B may determine a test hash value of document 232. In one or more embodiments, it may be determined that the test hash value of document 232 matches the hash value of document 232. For example, agent 230B may determine that the test hash value of document 232 matches the hash value of document 232. For instance, when the test hash value of document 232 matches the hash value of document 232, it may be determined that document 232 originated from IHS 110A.

At 390, the document may be read. For example, document 232 may be read by an application executing on IHS 110B.

Figure 4A:
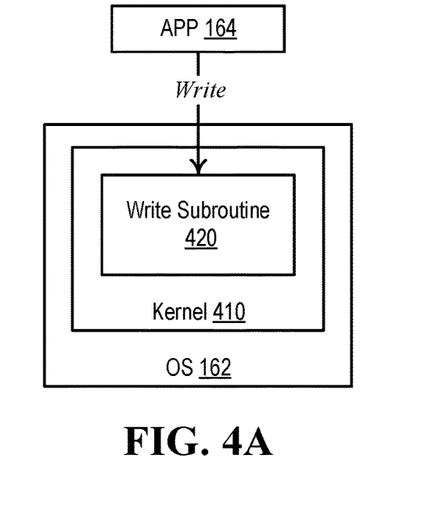
FIG. 4A illustrates an example of an application saving a document, according to one or more embodiments.

Turning now to FIG. 4A, an example of an application saving a document is illustrated, according to one or more embodiments. In one or more embodiments, an application may instantiate a request to an operating system to save a document. For example, APP 164 may instantiate a request to OS 162 to save a document 232. In one or more embodiments, a request to save a document may include calling a subroutine of a kernel of an operating system. For example, instantiating a request to save document 232 may include calling a write subroutine 420 of a kernel 410 of OS 162.

Figure 4B:
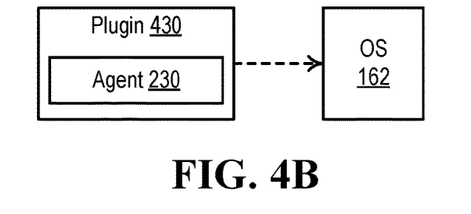
FIG. 4B illustrates an example of installing a plugin, according to one or more embodiments.

Turning now to FIG. 4B, an example of installing a plugin is illustrated, according to one or more embodiments. In one or more embodiments, a plugin may be installed in an operating system that may intercept a write subroutine and/or a read subroutine. For example, a plugin 430 may be installed in OS 162. For instance, plugin 430 may include agent 230. In one or more embodiments, a loadable kernel module may include agent 230. For example, agent 230 may include a filter driver.

Figure 4C:
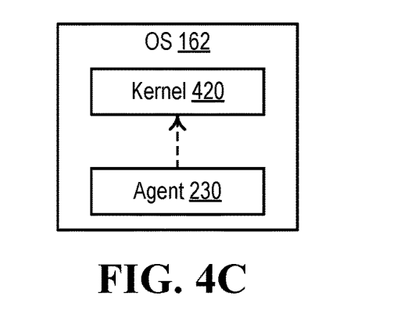
FIG. 4C illustrates an example of installing an agent, according to one or more embodiments.

Turning now to FIG. 4C, an example of installing an agent is illustrated, according to one or more embodiments. In one or more embodiments, an agent may be installed in a kernel of an operating system. For example, agent 230 may be installed in kernel 410. For instance, agent 230 may be or may include a device driver or a pseudo device driver. As an example, the pseudo device driver may be or may include a filter driver. In one or more embodiments, a loadable kernel module may be a kernel extension. In one or more embodiments, a pseudo device driver may not be associated with a physical device. In one or more embodiments, OS 162 may include the driver. For example, the driver may be or include a loadable kernel module. In one instance, when OS 162 loads the loadable kernel module, the loadable kernel module may direct or redirect requests to save documents. In another instance, when OS 162 loads the loadable kernel module, the loadable kernel module may direct or redirect requests to read documents.

Figure 4D:
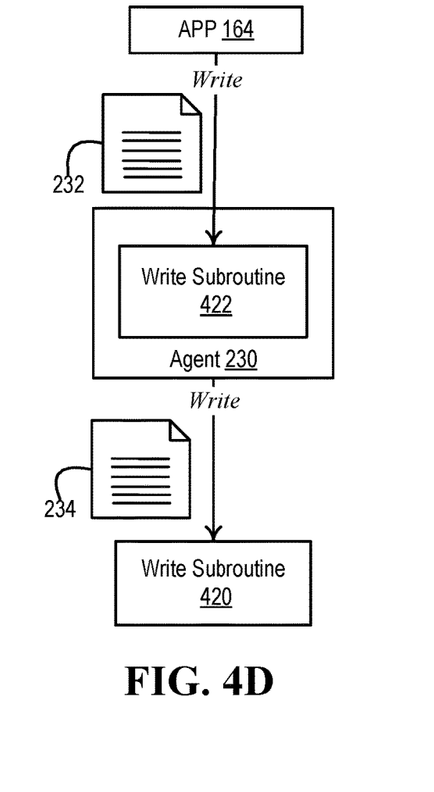
FIG. 4D illustrates an example of intercepting a request to save a document, according to one or more embodiments.

Turning now to FIG. 4D, an example of intercepting a request to save a document is illustrated, according to one or more embodiments. In one or more embodiments, a request to save a document may be intercepted. For example, a subroutine may intercept the request to save document 232. For instance, a request to save document 232 may include a call to a subroutine to write document 232 to a memory medium. As an example, APP 164 may request to save document 232, which may include calling the subroutine to write document 232 to the memory medium. In one or more embodiments, a write subroutine 422 of agent 230 may intercept the call to write subroutine 420 to write document 232 to a memory medium. For example, write subroutine 422 may encrypt document 232 to produce encrypted document 234.

In one or more embodiments, storing document 232 via the memory medium may include write subroutine 422 providing encrypted document 234 to a portion of OS 162 that would have saved document 232 before the subroutine intercepted the request to save document 232. For example, agent 230 may provide encrypted document 234 to write subroutine 420. For instance, agent 230 may call subroutine 420. In one or more embodiments, write subroutine 420 may write encrypted document 234 to a memory medium.

Figure 4E:
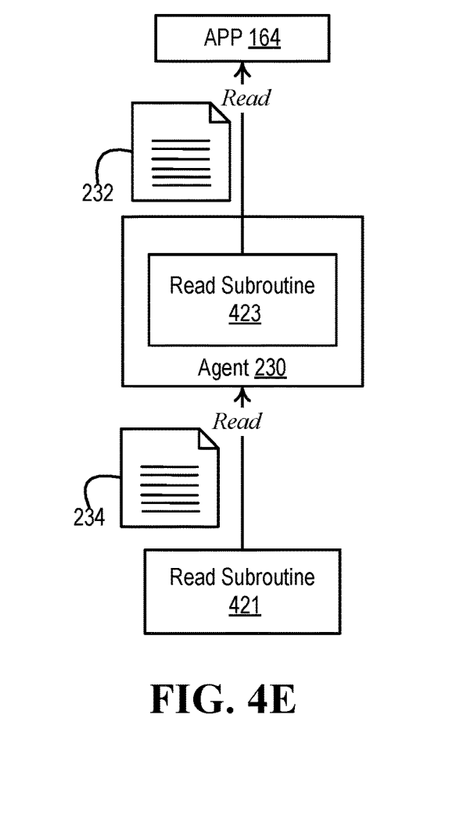
FIG. 4E illustrates an example of intercepting a request to retrieve a document, according to one or more embodiments.

Turning now to FIG. 4E, an example of intercepting a request to retrieve a document is illustrated, according to one or more embodiments. In one or more embodiments, a request to read a document may be intercepted. For example, a subroutine may intercept the request to read encrypted document 234. For instance, a request to read encrypted document 234 may include a call to a subroutine to read encrypted document 234 from a memory medium. As an example, APP 164 may request to read encrypted document 234, which may include calling the subroutine to read encrypted document 234 from the memory medium. In one or more embodiments, a read subroutine 423 of agent 230 may intercept the call to a read subroutine 421 to read encrypted document 234 from a memory medium. For example, read subroutine 423 may decrypt encrypted document 234 to produce documents 232.

In one or more embodiments, reading encrypted document 234 from the memory medium may include read subroutine 423 providing document 232 to a portion of OS 162 that would have read encrypted document 234 before the subroutine intercepted the request to read encrypted document 234. For example, agent 230 may provide document 232 to read subroutine 421. For instance, agent 230 may call subroutine 421. In one or more embodiments, read subroutine 421 may read encrypted document 234 from to a memory medium.

Figure 5:
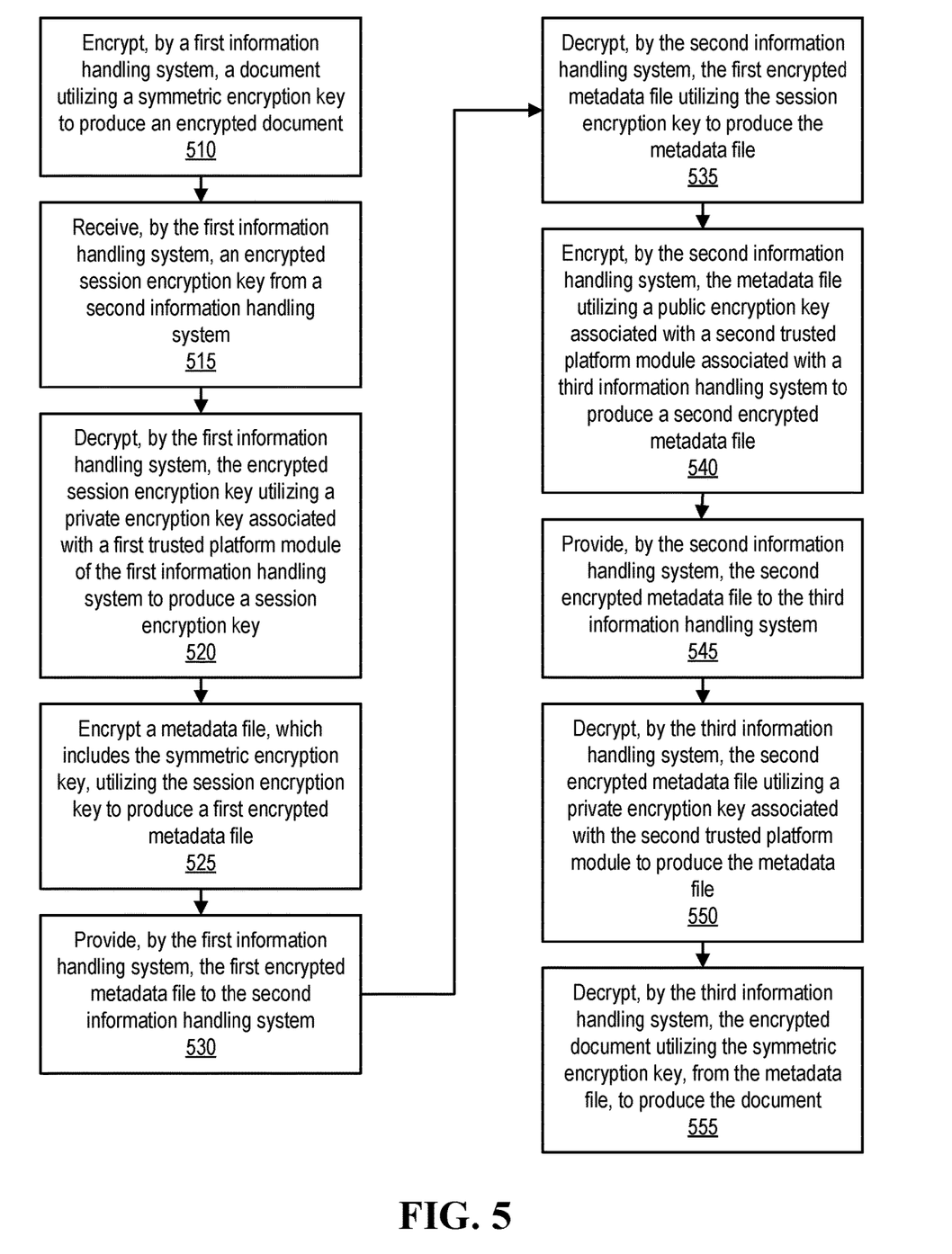
FIG. 5 illustrates another example of a method of operating a system, according to one or more embodiments.

Turning now to FIG. 5, another example of a method of operating a system is illustrated, according to one or more embodiments. At 510, a first information handling system may encrypt a document utilizing a symmetric encryption key to produce an encrypted document. For example, IHS 110A may encrypt document 232 utilizing symmetric encryption key 224 to produce encrypted document 234.

At 515, the first information handling system may receive an encrypted session encryption key from a second information handling system. For example, IHS 110A may receive an encrypted session encryption key from IHS 110C. For instance, IHS 110A may receive an encrypted session encryption key from IHS 110C via network 250.

At 520, the first information handling system may decrypt the encrypted session encryption key utilizing a private encryption key associated with a first trusted platform module of the first information handling system to produce a session encryption key. For example, IHS 110A may decrypt the encrypted session encryption key utilizing private encryption key 220A associated with TPM 140A of IHS 110A to produce a session encryption key.

At 525, the first information handling system may encrypt a metadata file, which includes the symmetric encryption key, utilizing the session encryption key to produce a first encrypted metadata file. For example, IHS 110A may encrypt metadata file 236, which includes symmetric encryption key 224, utilizing the session encryption key to produce encrypted metadata file 238A.

At 530, the first information handling system may provide the first encrypted metadata file to the second information handling system. For example, IHS 110A may provide encrypted metadata file 238A to IHS 110C. For instance, IHS 110A may provide encrypted metadata file 238A to IHS 110C via network 250.

At 535, the second information handling system may decrypt the first encrypted metadata file utilizing the session encryption key to produce the metadata file. For example, IHS 110C may decrypt encrypted metadata file 238A utilizing the session encryption key to produce metadata file 236.

At 540, the second information handling system may encrypt the metadata file utilizing a public encryption key associated with a second trusted platform module associated with a third information handling system to produce a second encrypted metadata file. For example, IHS 110C may encrypt metadata file 236 utilizing public encryption key 222B associated with TPM 140B associated with IHS 110B to produce encrypted metadata file 238B.

At 545, the second information handling system may provide the second encrypted metadata file to the third information handling system. For example, IHS 110C may provide encrypted metadata file 238B to IHS 110B. For instance, IHS 110C may provide encrypted metadata file 238B to IHS 110B via network 250.

At 550, the third information handling system may decrypt the second encrypted metadata file utilizing a private encryption key associated with the second trusted platform module to produce the metadata file. For example, IHS 110B may decrypt encrypted metadata file 238B utilizing private encryption key 220B associated with TPM 140B to produce metadata file 236.

At 555, the third information handling system may decrypt the encrypted document utilizing the symmetric encryption key, from the metadata file, to produce the document. For example, IHS 110B may decrypt encrypted document 234 utilizing symmetric encryption key 224, from metadata file 236, to produce document 232.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with at least a portion of one or more flowcharts, at least a portion of one or more systems, at least a portion of one or more methods, and/or at least a portion of one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An system, comprising:
a plurality of information handling systems comprising a processor, and a memory;
wherein a first information handling system of the plurality of information handling systems is configured to:
encrypt a document utilizing a symmetric encryption key to produce an encrypted document;
receive an encrypted session encryption key from a second information handling system of the plurality of information handling systems;
decrypt the encrypted session encryption key utilizing a private encryption key associated with a first trusted platform module of the first information handling system to produce a session encryption key;
encrypt a metadata file, which includes the symmetric encryption key, utilizing the session encryption key to produce a first encrypted metadata file; and
provide the first encrypted metadata file to the second information handling system;
wherein the second information handling system is configured to:
decrypt the first encrypted metadata file utilizing the session encryption key to produce the metadata file;
encrypt the metadata file utilizing a public encryption key associated with a second trusted platform module associated with a third information handling system of the plurality of information handling systems to produce a second encrypted metadata file; and
provide the second encrypted metadata file to the third information handling system; and
wherein the third information handling system is configured to:
decrypt the second encrypted metadata file utilizing a private encryption key associated with the second trusted platform module to produce the metadata file; and
decrypt the encrypted document utilizing the symmetric encryption key, from the metadata file, to produce the document.

2. The system of claim 1,
wherein the third information handling system includes an agent; and
wherein the agent is configured to:
intercept a read request of the encrypted document;
perform decrypting the encrypted document utilizing the symmetric encryption key, from the metadata file, to produce the document; and
provide the document to an application executing on the third information handling system.

3. The system of claim 2, wherein the agent includes at least one of a filter driver and a kernel loadable module.

4. The system of claim 1, wherein the third information handling system is further configured to:
receive the encrypted document via one or more of the first information handling system, the second information handling system, an email, a web server, and a removable memory medium.

5. The system of claim 1, wherein the first information handling system is further configured to:
generate the symmetric encryption key.

6. The system of claim 1, wherein the first information handling system is further configured to:
request the session encryption key from the second information handling system.

7. The system of claim 6, wherein the second information handling system is further configured to:
receive a request for the session encryption key from the first information handling system; and
in response to receiving the request for the session encryption key:
generate the session encryption key; and
provide the session encryption key to the first information handling system.

8. The system of claim 1, wherein the document includes a word processing document, a spreadsheet document, or a presentation document.

9. The system of claim 1, wherein the second information handling system stores the public encryption key associated with the second trusted platform module without having to receive the public encryption key associated with the second trusted platform module from the third information handling system.

10. The system of claim 1,
wherein the third information handling system includes an application; and
wherein the application is configured to read the document after the third information handling system decrypts the encrypted document utilizing the symmetric encryption key, from the metadata file, to produce the document.

11. A method, comprising:
encrypting, by a first information handling system, a document utilizing a symmetric encryption key to produce an encrypted document;
receiving, by the first information handling system, an encrypted session encryption key from a second information handling system;
decrypting, by the first information handling system, the encrypted session encryption key utilizing a private encryption key associated with a first trusted platform module of the first information handling system to produce a session encryption key;
encrypting, by the first information handling system, a metadata file, which includes the symmetric encryption key, utilizing the session encryption key to produce a first encrypted metadata file;
providing, by the first information handling system, the first encrypted metadata file to the second information handling system;
decrypting, by the second information handling system, the first encrypted metadata file utilizing the session encryption key to produce the metadata file;
encrypting, by the second information handling system, the metadata file utilizing a public encryption key associated with a second trusted platform module associated with a third information handling system to produce a second encrypted metadata file;
providing, by the second information handling system, the second encrypted metadata file to the third information handling system;
decrypting, by the third information handling system, the second encrypted metadata file utilizing a private encryption key associated with the second trusted platform module to produce the metadata file; and
decrypting, by the third information handling system, the encrypted document utilizing the symmetric encryption key, from the metadata file, to produce the document.

12. The method of claim 11, further comprising:
intercepting, by an agent of the third information handling system, a read request of the encrypted document;
performing, by the agent of the third information handling system, the decrypting the encrypted document utilizing the symmetric encryption key, from the metadata file, to produce the document; and
providing, by the agent of the third information handling system, the document to an application executing on the third information handling system.

13. The method of claim 12, wherein the agent includes at least one of a filter driver and a kernel loadable module.

14. The method of claim 11, further comprising:
receiving, by the third information handling system, the encrypted document via one or more of the first information handling system, the second information handling system, an email, a web server, and a removable memory medium.

15. The method of claim 11, further comprising:
generating, by the first information handling system, the symmetric encryption key.

16. The method of claim 11, further comprising:
requesting, by the first information handling system, the session encryption key from the second information handling system.

17. The method of claim 16, further comprising:
receiving, by the second information handling system, a request for the session encryption key from the first information handling system; and
in response to the receiving the request for the session encryption key:
generating, by the second information handling system, the session encryption key; and
providing, by the second information handling system, the session encryption key to the first information handling system.

18. The method of claim 11, wherein the document includes a word processing document, a spreadsheet document, or a presentation document.

19. The method of claim 11, wherein the second information handling system stores the public encryption key associated with the second trusted platform module without having to receive the public encryption key associated with the second trusted platform module from the third information handling system.

20. The method of claim 11, further comprising:
reading, by an application executing on the third information handling system, the document after the decrypting the encrypted document utilizing the symmetric encryption key, from the metadata file, to produce the document.

* * * * *